(12) United States Patent
Guttenberger

(10) Patent No.: US 12,724,588 B2
(45) Date of Patent: Sep. 1, 2026

(54) PROGRAMMABLE DEVICE FOR EXECUTING MULTIPLY ACCUMULATE OPERATIONS VIA LOOK UP TABLES

(71) Applicant: Thomas Eric Guttenberger, Keego Harbor, MI (US)

(72) Inventor: Thomas Eric Guttenberger, Keego Harbor, MI (US)

( * ) Notice: Subject to any disclaimer, the term of this patent is extended or adjusted under 35 U.S.C. 154(b) by 1034 days.

(21) Appl. No.: 17/743,506

(22) Filed: May 13, 2022

(65) Prior Publication Data

US 2023/0367550 A1 Nov. 16, 2023

(51) Int. Cl.
*G06F 7/544* (2006.01)

(52) U.S. Cl.
CPC .................................. *G06F 7/5443* (2013.01)

(58) Field of Classification Search
CPC ...... G06F 7/4988; G06F 7/5057; G06F 7/509; G06F 7/5443
See application file for complete search history.

(56) References Cited

U.S. PATENT DOCUMENTS 5,928,316 A 7/1999 Wong
6,067,382 A * 5/2000 Maeda .................... G06T 9/007 382/245
7,752,525 B2 7/2010 Pisek
8,433,744 B1 4/2013 Harding
8,626,814 B2 1/2014 Peleg
9,069,995 B1 6/2015 Cronie
9,141,131 B2 * 9/2015 Felch ...................... G06F 7/552
9,507,565 B1 11/2016 Streicher
10,180,820 B2 1/2019 Buchanan
10,505,638 B2 12/2019 Agazzi
10,657,439 B2 * 5/2020 Liu ..................... G06F 9/30029
10,698,657 B2 6/2020 Kang
10,748,603 B2 8/2020 Sumbul
10,872,295 B1 * 12/2020 Liu ....................... G06F 7/5443
11,016,731 B2 5/2021 Gradstein
11,120,327 B2 9/2021 Fishel
11,175,892 B2 11/2021 Langhammer (Continued)

FOREIGN PATENT DOCUMENTS

EP 3059894 2/2018
EP 2963539 3/2020

OTHER PUBLICATIONS

Tim Dettmers, 8-BIT Approximations for Parallelism in Deep Learning, Published as a conference paper at ICLR 2016, 19, Feb. 2016, arXiv:1511.04561v4 [ca.NE].

(Continued)

*Primary Examiner* — James Trujillo
*Assistant Examiner* — Markus Anthony Villanueva
(74) *Attorney, Agent, or Firm* — David J. Connaughton, Jr.; Justin P. Tinger; Yafei Xue

(57) ABSTRACT

The present disclosure relates to a computer processor configured to execute multiply-accumulate operations using dedicated multiplication and addition lookup tables (LUTs). The multiplication LUT generates low-precision, minimum-error products within a normalized range and provides addressing for the addition LUT. The addition LUT operates on same-sign, same-exponent inputs, applies balanced rounding, and determines a base-2 exponent of accumulated sums based on clock-cycle counts.

20 Claims, 9 Drawing Sheets

(56) References Cited

U.S. PATENT DOCUMENTS

| | | | | |
|---|---|---|---|---|
| 11,182,128 | B2 | 11/2021 | Okumura | |
| 2014/0207838 | A1* | 7/2014 | Danne | G06F 9/3832 708/235 |
| 2018/0232627 | A1* | 8/2018 | Rozen | G06N 3/063 |
| 2019/0370642 | A1* | 12/2019 | Liu | G06N 3/063 |
| 2020/0073636 | A1 | 3/2020 | Cammarota | |
| 2020/0387351 | A1 | 12/2020 | Agrawal | |
| 2021/0111722 | A1 | 4/2021 | Kalsi | |
| 2021/0311734 | A1 | 10/2021 | Boswell | |
| 2021/0350205 | A1* | 11/2021 | Yan | G06N 3/082 |
| 2021/0382691 | A1 | 12/2021 | Kim | |
| 2023/0144950 | A1* | 5/2023 | Park | G06N 3/048 712/221 |

OTHER PUBLICATIONS

Yeonkweon Jeon, BIQGEMM: Matrix Multiplication with Lookup Table for Binary-Coding-baeed Quantized DNNs, Proceedings of the International Conference for High Performance Computing, Networking, Storage and Analysis, Nov. 2020, Article No. 95 pp. 1-16.

Xilinx data sheet, DS180 v2.6.1, manufacturer data sheet specification.

Xilinx specification sheet, v7.1 31 PG0&0, manufacturer data sheet apecification.

* cited by examiner

| | | | | | | | | | | | |
|---|---|---|---|---|---|---|---|---|---|---|---|
| 702 | Terms | 715 | 358 | 179 | 90 | 45 | 23 | 12 | 6 | 3 | 2 | 1 |
| 704 | Encoding Range | [0,1) | [0,2) | [0,4) | [0,8) | [0,16) | [0,32) | [0,64) | [0,128) | [0,256) | [0,512) | [0,1024) |
| 706 | Exponent | 0 | 1 | 2 | 3 | 4 | 5 | 6 | 7 | 8 | 9 | 10 |
| 708 | Clock Cycle Start | 0 | 368 | 557 | 657 | 712 | 745 | 767 | 783 | 796 | 808 | 819 |

| | | |
|---|---|---|
| 710 | Clock Cycle(s) per operation | 1 |
| 712 | Static Buffer Between Transitions | 10 |
| 714 | Dynamic Buffer Between Transitions | N/A |

902 904 906 908 910 912

| bit Encoding | Distinct Encodings | Full Matrix | LUT Registers | RAM Allocated (16 bit registers) | Total Bytes RAM Allocated |
|---|---|---|---|---|---|
| 6 | 64 | 4,096 | 2,048 | 32,768 | 8,192 |
| 7 | 128 | 16,384 | 8,192 | 131,072 | 32,768 |
| 8 | 256 | 65,536 | 32,768 | 524,288 | 131,072 |
| 9 | 512 | 262,144 | 131,072 | 2,097,152 | 524,288 |
| 10 | 1,024 | 1,048,576 | 524,288 | 8,388,608 | 2,097,152 |
| 11 | 2,048 | 4,194,304 | 2,097,152 | 33,554,432 | 8,388,608 |
| 12 | 4,096 | 16,777,216 | 8,388,608 | 134,217,728 | 33,554,432 |
| 13 | 8,192 | 67,108,864 | 33,554,432 | 536,870,912 | 134,217,728 |
| 14 | 16,384 | 268,435,456 | 134,217,728 | 2,147,483,648 | 536,870,912 |
| 15 | 32,768 | 1,073,741,824 | 536,870,912 | 8,589,934,592 | 2,147,483,648 |
| 16 | 65,536 | 4,294,967,296 | 2,147,483,648 | 34,359,738,368 | 8,589,934,592 |
| 32 | 4,294,967,296 | 1.84467E+19 | 9.22337E+18 | 1.47574E+20 | 3.68935E+19 |
| 64 | 1.84467E+19 | 3.40282E+38 | 1.70141E+38 | 2.72226E+39 | 6.80565E+38 |

Fig. 9

PROGRAMMABLE DEVICE FOR EXECUTING MULTIPLY ACCUMULATE OPERATIONS VIA LOOK UP TABLES

BACKGROUND OF THE INVENTION

Field of the Invention

The present invention is related to the field of computer processors. More particularly, the embodiments relate to a computer processor with architecture, systems, and methods which enable the invention to perform high speed, power efficient multiply accumulate operations on a programmable device—e.g., a field-programmable gate array (FPGA) or other programmable logic device (PLD).

Background

It has become increasingly common to design field-programmable gate arrays (FPGAs) or other programmable logic devices (PLDs) as specialized processing hardware to interact with standard computer hardware. These PLDs are designed to handle the execution of a specific computational task of a much narrower scope. Such specialized hardware may include circuitry on a PLD designed to perform a logical or a mathematical operation which is constrained to a smaller set of operations or admissible values. The field of designing specialized hardware components for specific tasks within a computer system is also known as Application Specific Integrated Circuits, or Adaptive Computing, or Edge Computing.

One specialized computing task which is growing in importance is the multiply accumulate (MAC) operation which is necessary to yield results of the calculations required to support artificial intelligence algorithms. Computation effort required for multiplication of two square real matrix product is referred to as a O(n^3) problem in terms of computational complexity. In computer systems its not just the complexity of computation that defines the performance, but also the time required to execute each operation, or acquire the data from local or from remote location and transmit the data to the end point.

A look up table (LUT) operation stored in SRAM is the fastest way to access information in a computer chip. By storing results of multiplication and/or addition operations in registers to be accessed by look up tables, significant execution speed and power savings improvements can be achieved.

The invention herein improves execution time and peak compute energy efficiency for matrix multiplication calculations required by artificial intelligence algorithms. Artificial intelligence, or interchangeably referred to here as machine learning, has been utilized in various applications and its uses are expanding. As such, there is a great need for faster and more efficient devices to execute the supporting matrix multiplication calculations. More specifically the set of problems which the invention can yield significant improvements in speed and power consumption include regression algorithms, classification algorithms, feature selection algorithms, convolutional neural networks, recurrent neural networks, graph neural networks, and others.

Artificially intelligence today is applied to business and scientific problems such as image recognition, natural language processing, drug discovery, fraud recognition, economic forecasting, network analysis, chemical analysis, etc. The list of applications for which the algorithms are applied is rapidly growing and in the future will include an unknown plethora of other applications.

SUMMARY

An apparatus and method for a computer processor to implement fast low precision (7, 8, 9, and 10 bit) multiply accumulate operations as required in machine learning applications is disclosed. The processor operates by compressing input data of a range between −1, and 1 to a lower precision encoding and subsequently by retrieving the values of multiplication and addition operations via look up tables (LUTs). Two binary integer input numbers are concatenated to from a register address of the multiplication LUT which returns a number encoding of the same format. Multiplication results are bifurcated into negative and positive values and each of those groups are stored at opposite ends of the number cache. Addition LUTs are specified for operations among numbers of the same sign and from a single implied base 2 exponent magnitude. The return values of the addition LUT are in the same encoding format as its inputs with the exception that the result of the operation between those two numbers is encoded in the range between 0 and the successively greater base 2 exponent. A clock cycle count rule established at runtime implies the exponent of the final return value for each the negative and positive number summations. Using a clock cycle rule to imply the exponent increases the precision of rounding via LUT for each addition operation relative to alternatives that explicitly include bits to account for the exponent term. The clock cycle rule applied also makes an overflow condition impossible. The final negative and positive number terms resulting from LUT summations are cast to standard IEEE 754 types to allow for bitwise arithmetic on a single final addition operation, which can occur on or off device. The invention allows for a feasible implementation of multiply accumulate LUTs in RAM on field-programmable gate array (FPGAs) or other programmable logic devices (PLDs) for various low precision encodings. The invention minimizes the time and power consumption required to execute the multiply accumulate calculation. The resulting invention is up to 7 times faster at this calculation than previously established leading methods and devices.

BRIEF DESCRIPTION OF THE DRAWINGS

FIG. 9 provides a table of memory requirements for LUTs of different bit size number encodings.

DETAILED DESCRIPTION

Figure 1:
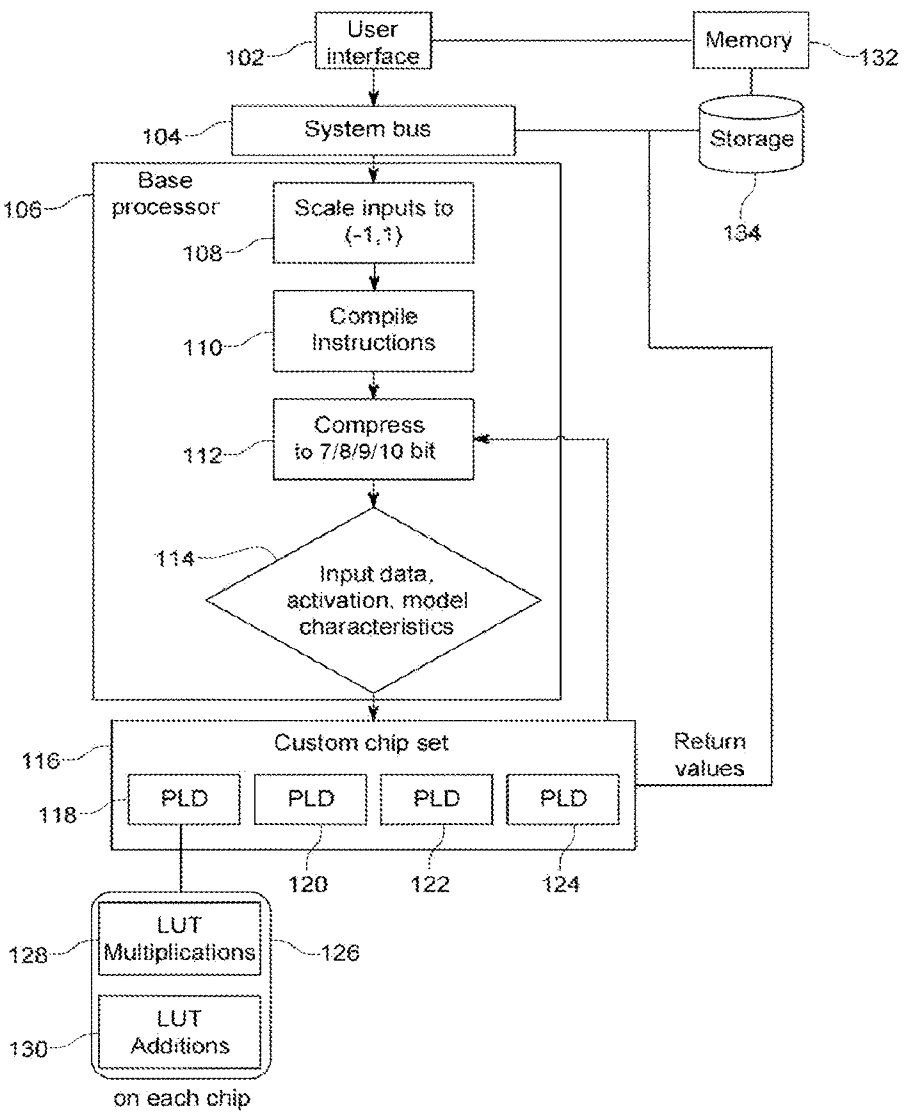
FIG. 1 illustrates a computer system including base computer with multiple specialized PLDs as described herein.
Figure 2:
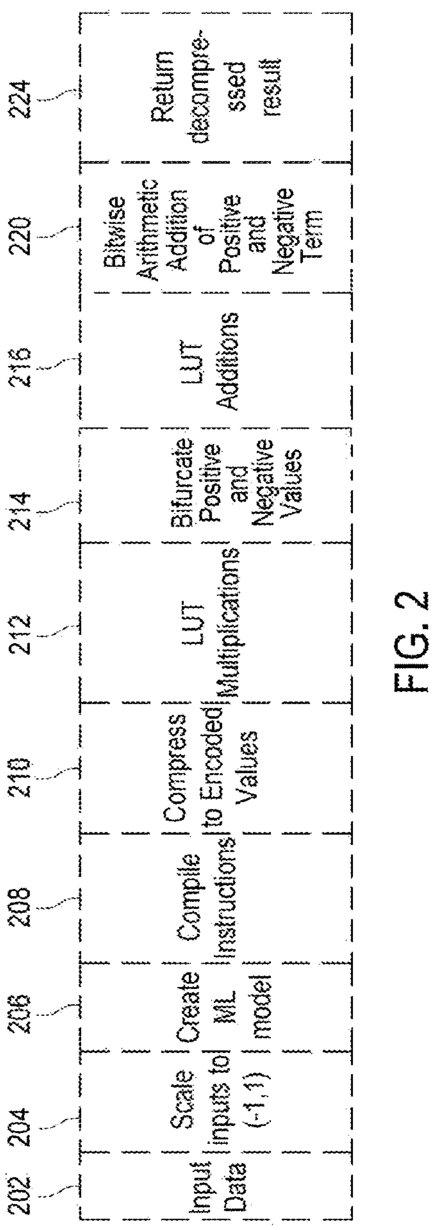
FIG. 2 illustrates an instruction set for the computer system and specialized hardware.
Figure 3:
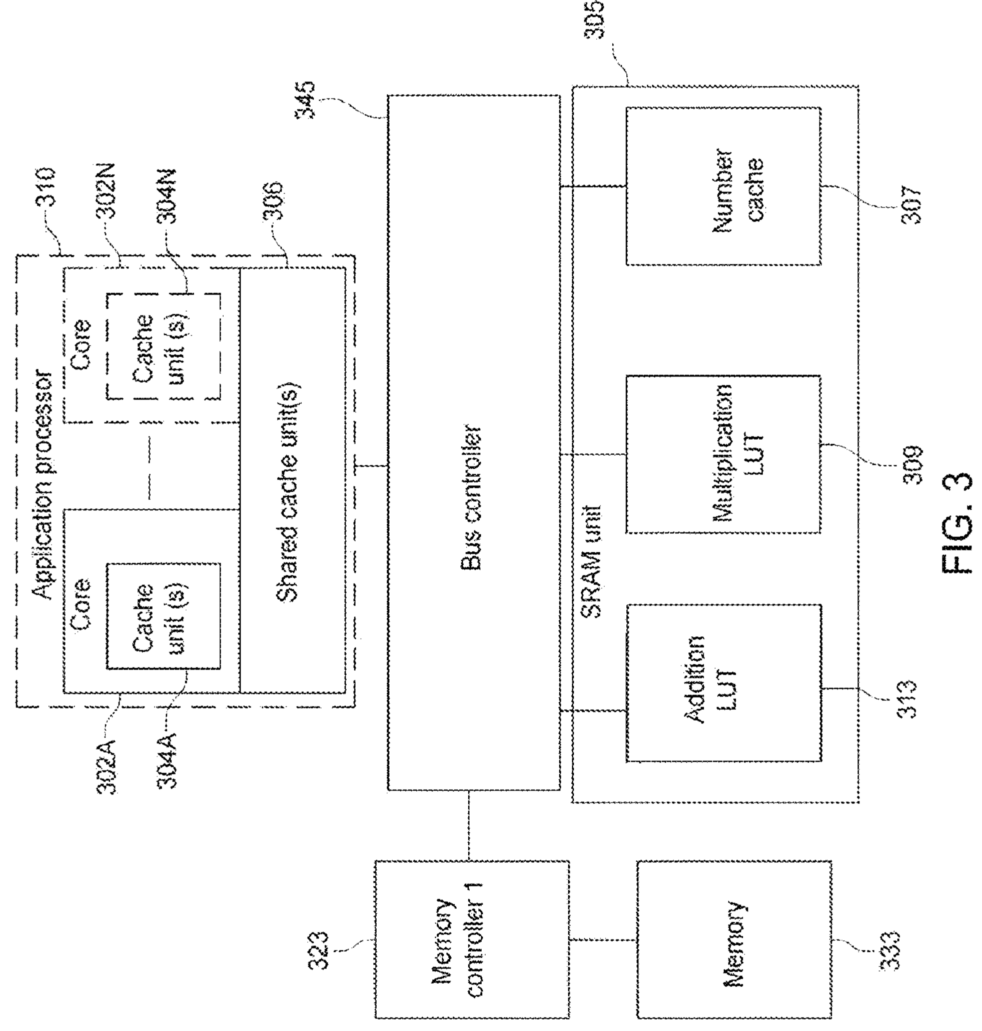
FIG. 3 is a block diagram of a system on a chip for the specialized PLD described herein.
Figure 4:
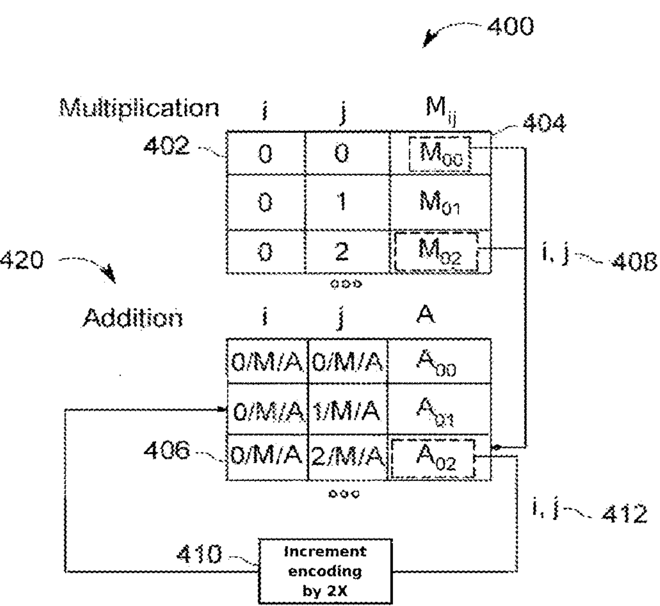
FIG. 4 is an illustration of the multiplication and addition LUTs and the interaction between those components.

Introduction and Problem Description:

The fundamental problem with performing multiplication and addition operations via LUTs is that the total number of memory registers dedicated to these pre-stored values becomes untenable for number encodings typically used in computers. The RAM used by a LUT is generally too large relative to the physical amount of switches on the configurable device. There are two primary issues that arise from this memory constraint. The first issue is that of the precision of numbers represented by minimalist encodings. The second major constraint is the occurrence of overflow and underflow conditions and virtual certainty of those conditions for any practical problems requiring a multiply accumulate operation.

The total amount of RAM memory required for multiplication and addition LUTs grows exponentially with respect to the number of bits used. A full lookup table of multiplication results using 16-bit half precision numbers per IEEE 754 standard would require over 2 billion memory registers, and would require over 8 GB of RAM assuming a 16 bit register size. A table of RAM memory requirements is shown in FIG. 9. The RAM occupied by static LUTs makes implementation either impossible or extremely impractical for number encodings typically used in computer applications. The memory used to implement these LUTs reduces the remaining memory resources available to store dynamic data as required to perform any computer operation. It is imperative to minimize the RAM memory allocated to the pre-stored values of the LUTs. The speed improvement of the multiply accumulate operation as a result of the LUTs must proportionally exceed the RAM allocated to the LUTs relative to total RAM in order for the computing device to be an improvement.

The spec sheet (DS180 v2.6.1) for commercially available FPGA chips offered by prominent manufacturer Xilinx™ Field-Programmable Gate Array (FPGA) indicates that the Total Block RAM on these devices is in the range of 170 kB to 13.17 MB. Currently the majority of these commercially available FPGAs fall within the range of 1.5 MB to 5 MB. Accessing the results of multiplication and addition operations via LUTs becomes more practical on smaller encodings, such as 7-bit, 8-bit, 9-bit, and 10-bit architectures. However other problems arise with these encodings, namely the problems of a) reduced precision, and b likelihood of overflow and underflow conditions.

In order to design a solution which operates effectively in light of the RAM memory constraint, the encoding of numbers should be prescribed in a way to preserve the greatest amount of precision over the operative range of numbers utilized at a given time for a given computing operation. The MAC operation as it is utilized in machine learning training and inference problems has properties which allow for hardware architecture designs that remediate the issues of precision and operable range through the course of its calculation.

The numerical characteristics of the set of problems on which the invention can be applied make the invention ideal as a specialized processor dedicated to perform the multiply accumulate operation required in matrix multiplications. Prior research has shown that compression to low precision 8 bit encoding of numbers scaled between −1, and 1 did not have a significant detrimental effect on the model accuracy and resulted in speed up factors on the order of 50 times depending on the input characteristics of the model when applied to the transfer of data between GPUs. This research only implemented the compressed number encodings on the data transfer between hardware components and did not address implementation of the arithmetic operations of multiplication and addition within the hardware itself.

Solutions obtained by various machine learning algorithms are invariant with respect to input data scaling. Data scaling is a process where numbers can be represented as decimal proportions of the maximum value in a series. Data scaling limits the operative range of input values. By scaling the inputs originating from a standard computing system passed to the programmable device, the operable range of the multiplication LUT inputs can be limited to [−1,1]. Likewise the same scaling can be applied to activation functions, or activation functions bound by this range can be used.

The occurrence of an overflow condition is another fundamental issue in implementing the multiply accumulate operation via LUT. An overflow condition resulting from the multiplication of numbers limited to the range [−1,1] is a non-issue because the product of numbers within this range will never exceed this range. However, the addition operation for any practical use case will inevitably return a summation exceeding the bounds of −1 and 1. An addition LUT must account for any combinations of two inputs at any given time of execution of that addition.

The absolute amount of numerical precision for the full spectrum of IEEE 754 standard encodings can be vastly different due to the exponent term of the encoding. For example, in a tradition computer encoding architecture one number may be split into equal increments by the binary bisection tree on a range from 2^-10 and 2^-9, and another number may be split into increments in the same manner on an interval between 2^7 and 2^8. Obviously the precision of these two numbers is vastly different, and addition between these numbers provides no practical utility. Notwithstanding a conventionally designed LUT still needs to provide a result or some kind of operating instruction for this circumstance.

A property of the multiply accumulate calculation allows for some restriction of the magnitude of numbers which will operate with each other. Following the multiplication step, there will be the greatest number of individual terms, which in the case of a problem with bounded inputs, are of a known range. This allows for a reduction of the associative addition operations to numbers in a smaller range. This operative range can be determined by the depth within the summation tree, and the depth within the summation tree can be determined by a clock cycle rule established at runtime.

The invention herein describes a novel solution for addressing the problem of integer overflow, and simultaneously preserves maximum rounding precision, and occupies minimal RAM. The inventive steps described herein to implement the addition operation via LUT are necessary for maximum preservation of precision while allowing the device to operate without overflow errors. Implementing the multiply accumulate via LUT is the fastest way possible to process the operation and the aforementioned constraints have prevented any comparable device from being previously furnished.

Description of the Drawings:

FIG. 1 is a flow chart illustrating an exemplary computer system containing different PLDs as described in the invention herein. A front end user interface (102) is used to select the data set, model type, hyperparameters, and other specific information relating to the machine learning model. The information is routed through the system bus (104) to the base computer application processor (106) which contains the processes of scaling the input data between −1, 1 (108), compiling the modeling instructions (110), and compressing the input data (112), and routing the data (114) to the appropriate specialized PLD (118) within the custom chip set (116). Each of the PLDs within the custom chip set can be designed and calibrated based on activation function, input data size, model selected, and tolerance for quantization error. On each of the custom PLDs, there will be LUT Multiplications (128) and LUT Additions (130) to carry out the Multiply Accumulate operation. Upon completion of the compiled instructions, results will be returned to the user interface and decompressed to match the base architecture of the input data accessed by the system bus, storage, memory, and user interface.

First the input data (202) is received. Then these numbers are scaled to a range between −1, and 1 (204). Then a machine learning model is created (206), and compiled into a set of instructions (208). The numbers are compressed (210) into the encoding architecture of the custom hardware. The LUT multiplications are performed (212), and these results are bifurcated according to sign (214) via either a standard logical gate checking for sign or implied through address register locations within the multiplication LUT. Once the results of multiplications have been bifurcated to opposite ends of the number cache (307), LUT additions (216) are performed between numbers of the same sign. The LUT additions will result in a return encoding state transition to one of N addition LUTs (218). LUT additions will continue between two numbers within each group as specified by the compiled instructions (208) until there exist only single positive and negative terms, at which time those numbers will be added together via standard binary arithmetic (220) either on or off the device. Finally a decompressed number is returned (224).

The Application controller (310) interfaces with the Bus controller (345). The memory controller (323) manages access to the stored the input data and the compiled instructions stored in memory (323) originating from the Application Controller (310). The SRAM unit (305) contains the number cache (307), multiplication LUT (309), and addition LUT (313). The static values stored in the multiplication LUT (309) and addition LUT (313) are referenced to return values to the number cache (307) of specific multiplication or addition operations between two numbers. The number cache (307) keeps record of the numbers with negative and positive numbers stored at the opposite ends of the memory.

Two numbers (i, j) are multiplied together. The numbers (i, j) (402) in the multiplication LUT (400) are binary integers which represent decimal values according to the number encoding scheme employed (FIG. 6) and the number of bits used to encode the numbers. The binary numbers (i, j) as a pair are concatenated and that concatenated binary number is associated with a specific register, with an encoded return value M_ij (404) stored in RAM memory of the multiplication LUT (400). The table contains all pairs of (i, j) where (i, j) each range from 0 to 2 exponential to the number of bits, minus 1. The number M_ij returned as a result of the multiplication lookup operation will be bifurcated by sign and referenced together with another M_ij value of the same sign as an (i, j) input pair (408) of the addition LUT. The (i, j) inputs (408/412) and input register assignment components (406) of the addition LUT (420) directly and exactly correspond to a result of both multiplication and addition operations. These inputs (408/412) are concatenated as a binary number in the same way as those were in the multiplication LUT in order to associate the addition operation between the input pair (406) with a specific register address within the addition LUT (420). The return value (412) of any addition operation is implied to be double the value of an equivalent encoding of its inputs (410). In this way the binary number inputs (408/412) and the input register assignment components (406) can be re-used by future iterations of additions between numbers.

Figure 5:
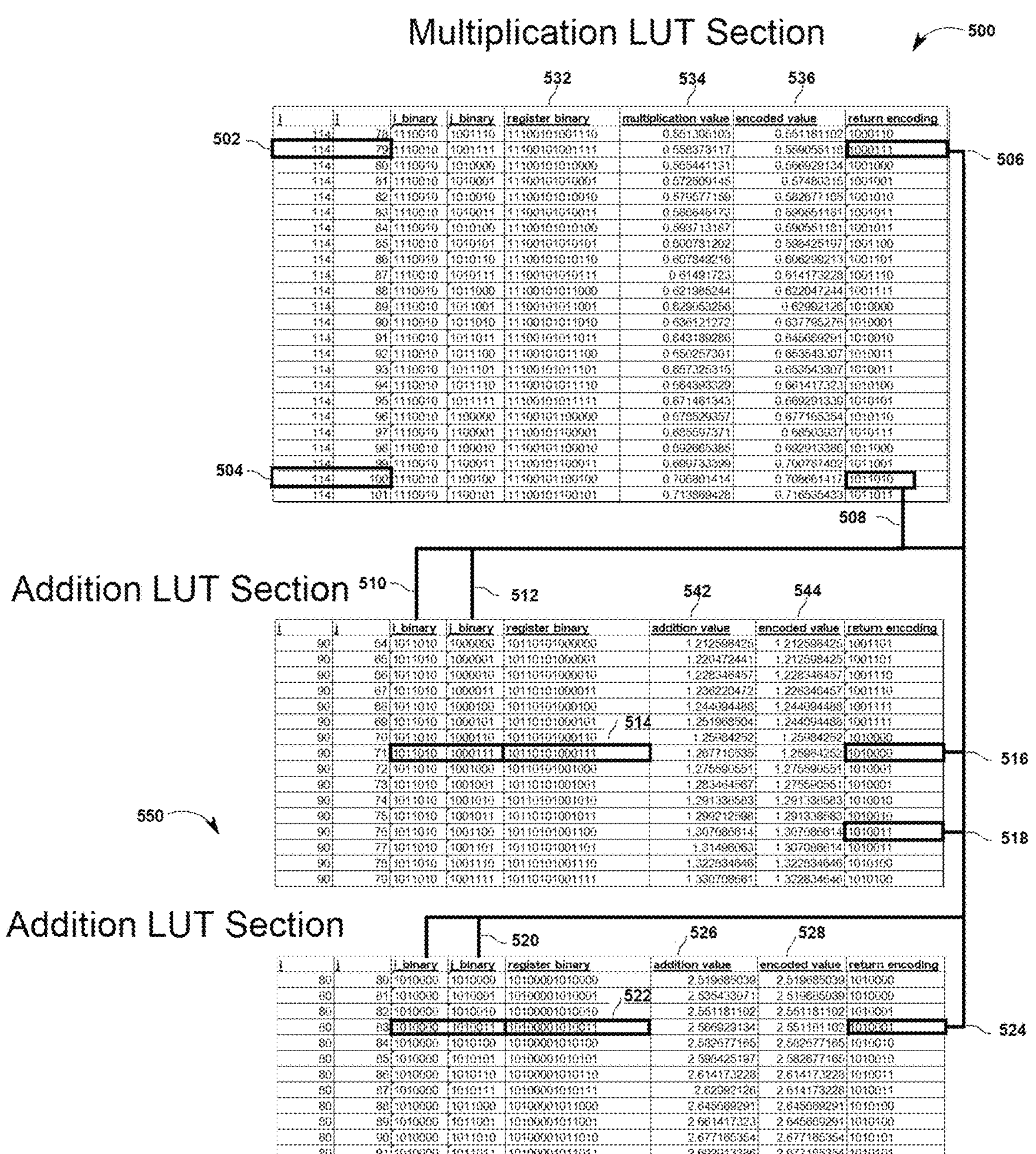
FIG. 5 provides an exemplary illustration of the multiplication and addition LUTs and the interaction between those components.

A section of the multiplication LUT (500) is shown in FIG. 5 containing 7 bit unsigned full mantissa (606) numbers. Using 7 bit unsigned full mantissa numbers, input values (i, j) (502/504) to the multiplication LUT are uniformly distributed in the range 0 and 1 inclusive with each integer representing that multiple of 0.0078740157480315. The inputs to a first multiplication (502) are concatenated to form the row value as shown in the binary register address column (532). The accurate decimal value of a multiplication between two compressed numbers (i, j) is displayed in the multiplication value column (534). The decimal value of the return encoding (506) is displayed in associated row of the encoded value column (536). The encoded value (506) is consistent with the binary integer inputs to the addition LUT (550). The difference between the values in multiplication value column (534) and the encoded value column (536) represent the error introduced by the multiplication operation for any given row. The encoded value is prescribed to give the minimum error for any multiplication operation. A second input pair (504) is referenced and its return encoding (508) is passed to the addition LUT (550) along with (506). This input pair (506 and 508) is concatenated to reference the binary register address of the addition LUT (514) with associated row values for addition value (542), encoded value (544) and return encoding (516). The difference between the addition value (542) and the the encoded value (544) for any given row represents the error introduced by the addition operation between those two numbers. The encoded value is prescribed to give the minimum error for any addition operation. In the case of an equal sized error, the errors are distributed equally above and below the addition value (542) for each unique addition value (542). The equal distribution of errors is important to error reduction of the system and is supported by the strong law of large numbers which suggests a cancellation of errors over a large number of terms to be quantized. A second return encoding resulting from an addition operation between two inputs (518) is referenced together with (516) and these numbers are supplied as the (i,j) input pair (520) and concatenated to form the associated binary register address (522) and reference its return encoding (524). Here the addition value (526) and encoded value (528) are twice the magnitude of the same register address on the previous iteration of the addition operation. The values for addition value (526/542) and encoded value (528/544) in both displayed versions of the addition LUT (550) are implied by the depth within the summation, which is implied by a clock cycle count controller. Addition operations continue to reference binary register addresses composed of two inputs, returning an encoding equivalent to the value on the successively larger base 2 exponent until there is a single value for the summation and the final value exponent is implied by the total clock cycle count.

Figure 6:
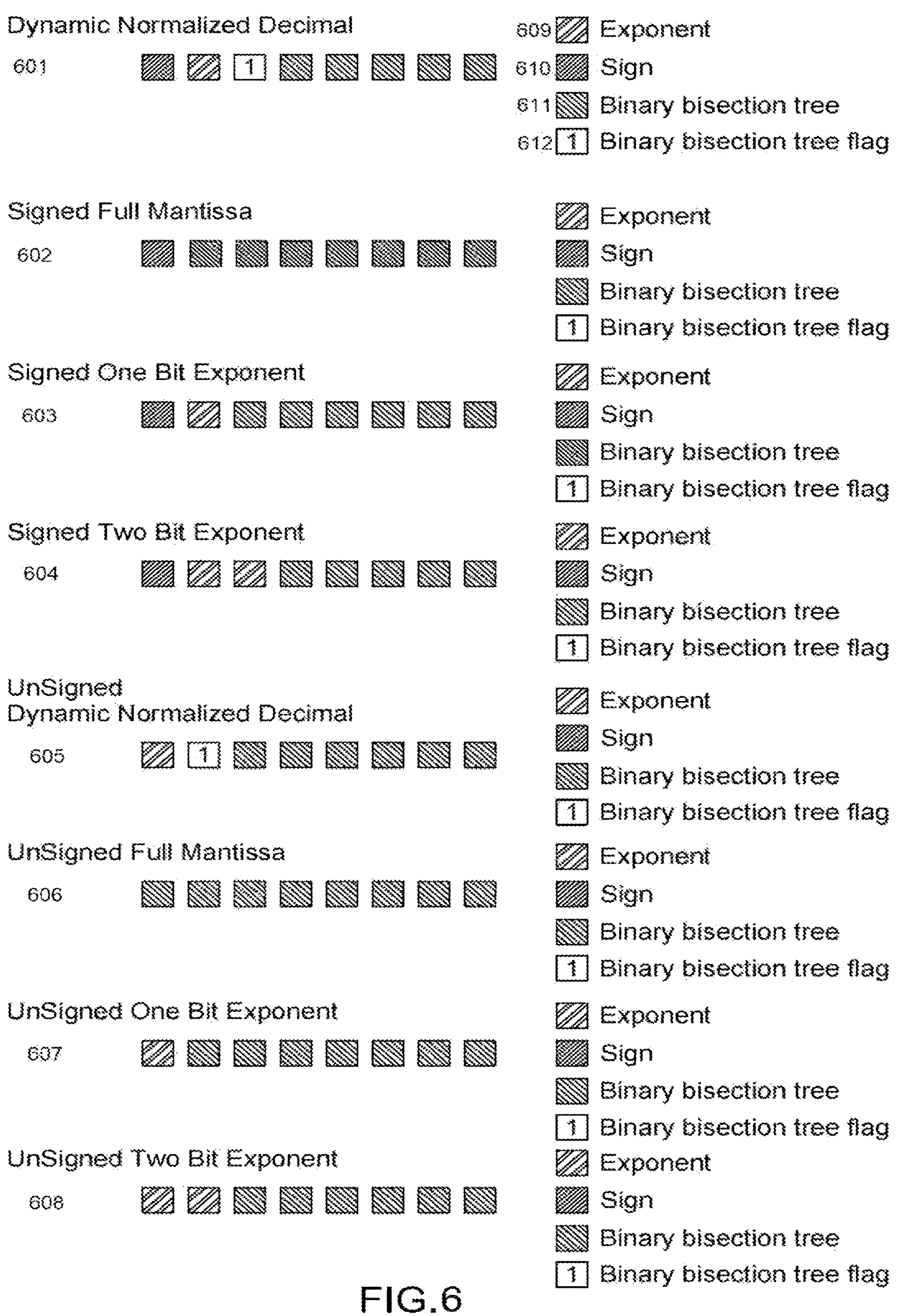
FIG. 6 is an illustration of exemplary encodings.

The pictured variations of encodings in FIG. 6 including Dynamic Normalized Decimal (601), Signed Full Mantissa (602), Signed One Bit Exponent (603), or Signed Two Bit Exponent (604) are best applied to the multiplication LUTs, where the exact number of exponent (609), sign (610), and mantissa (611) bits and the presence of a exponent flag bit (612) can be rearranged in different embodiments of the invention. Unsigned encoding variations (605, 606, 607, 608) are best utilized in the addition LUT to increase the precision of return values of the same length. Embodiments of the invention where unsigned encoding variations are used are in computing problems which do not require negative values, or in device configurations which use an additional sign check, or in device configurations where the unsigned encoding is used only in the addition LUT and not the multiplication LUT. Unsigned encoding variations (605, 606, 607, 608) save the total amount of RAM required to store the LUT return values. An exemplary embodiment of the invention operates with Unsigned Full Mantissa (606) scheme. The total number of bits referenced in this drawing is only illustrative and the same design patterns can apply to number encodings of any length.

Figures 7, 7A, 7B:
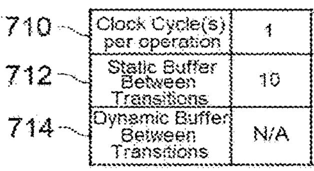
FIG. 7 provides an exemplary table of a clock cycle controller instance established at runtime and its parameters.

In the exemplary exemplary illustration provided by FIG. 7 a clock cycle controller instance established at runtime can be observed. At onset of the summation the number of terms (702) to be summed is 715. At this time the addition LUT is operating on numbers encoded (704) within the range of 0 and 1, inclusive which corresponds to a base 2 exponent (706) of 0. The clock cycle start (708) is set to 0 at the inception of the first addition operation between two terms. The clock cycle start (708) for each column of the table indicates the beginning of number operations among that range according to the clock controller parameters in FIG. 7*b*, clock cycles per operation (710), and static buffer between transitions (712). The parameters (710 and 712) can be programmable medium dependent. The buffer (712) may or may not be static, and a dynamic buffer rule (714) can be determined through research and development on the specific programmable medium.

Figure 8:
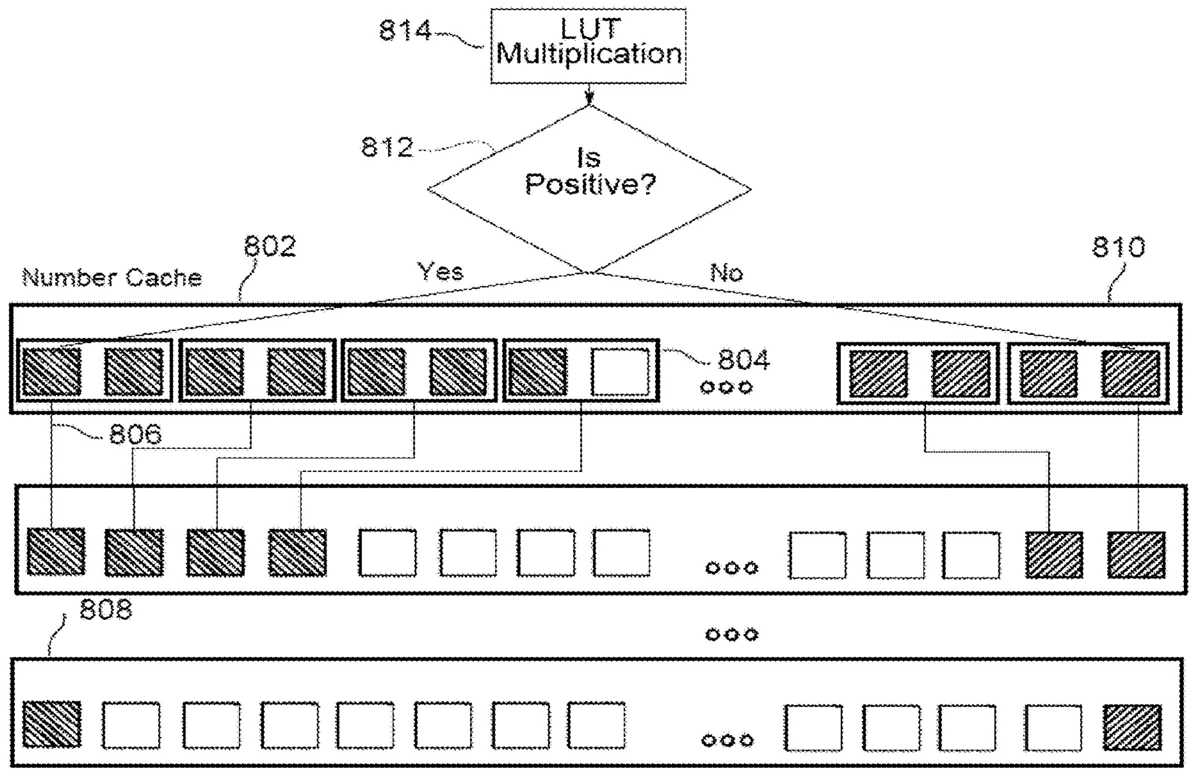
FIG. 8 provides an illustration of the bifurcation process resulting from multiplication, bifurcated positive and negative numbers in the number cache, and the process of addition.

Numbers are bifurcated following LUT multiplication. Bifurcated positive and negative numbers in the number cache and the process of addition is shown in FIG. 8. The result of LUT multiplication (814) is bifurcated to opposite ends of the number cache (802) according to sign (812). This bifurcation (812) can be done via a standard logical gate checking for sign or implied through address register locations within the multiplication LUT (128). Additions between two numbers begin from one end of the number cache (802) and work inward until an empty register is encountered (804). The number resulting from an addition operation is replaced in the first available cache register of the same side (806). For example, numbers being stored in the first and second registers are added together and the result of that operation is replaced into the first register. Following this same process the addition operation between the numbers in the third and fourth registers will have its result replaced into the second number register. This process is followed until an empty register is encountered (804). In the event that an odd number of terms is required to be summed in any encoding range, the final single term will be implicitly added with 0. Additions of positive numbers will continue until a single value is obtained (808), and its implied exponent will be stored. Then the clock cycle controller will be reset to 0 and the process will be repeated on the other end of the number register for negative numbers (810).

The RAM required to provide a LUT of operations grows exponentially with respect to the number of bits numbers are encoded by. The bit encoding column (902) indicates the number of bits a number is represented by. The distinct encoding column (904) indicates the integer number of distinct numbers that can be represented by the associated number of bits. The full matrix column (906) indicates the number of registers required to contain a full matrix of distinct input pairs, which are order dependent. The LUT registers column (908) indicates the number of register required to contain a lower diagonal matrix of input pairs. The RAM allocated (910) indicates the number of bits required to store a lower diagonal matrix of input pairs if the register size is 16 bits, and a single number occupies a full register. The Total RAM allocated bytes column (912) indicate the number of bytes required to store a lower diagonal matrix of input pair for a LUT if single numbers are assumed to occupy a full 16 bit register. As displayed LUTs on lower precision encodings can feasibly fit on commercially available FPGAs. LUTs on standard number sizes such as 16 bit, or 32, bit are not feasible to implement.

How the Invention Addresses the Problems:

Execution of the multiply accumulate operation in hardware via LUTs requires different data return magnitudes at different execution times in order to preserve maximum precision. The return data magnitude affects the precision and operable range of the numbers referenced. More precision is obtained for the same amount of memory by implying the exponent and using all available bit registers to encode a number. The number is encoded within a known exponent magnitude at that time. Due to the scaling applied to device number inputs, the multiplication LUT will never return numbers outside of the bounds −1, and 1, so return values for the multiplication LUT are only within this range.

The more complex situation of LUT addition, which is only bounded by input length, is accounted for by incrementing the return interval by a factor of 2. The same binary number format with an implicitly different magnitude is returned by progressively growing base 2 exponent value. Because the return encoding is of the same format the input, this return number can be recycled as an input to the addition LUT indefinitely. Because numbers can be recycled as inputs indefinitely the overflow condition probability is nullified. The invention described herein uses a addition LUTs which imply the base 2 exponent which can increase without bound, so an overflow condition is not possible.

Return values resulting from an addition operation can be prescribed in a single LUT because those encodings follow the same pattern intra-exponent pattern regardless of magnitude. With a repeatable, reusable return encoding, it is possible to prescribe register assignments with an implied destination exponent based on the live clock cycle count and input size of positive and negative number terms established at runtime. The properties of a repeated return encoding, and the design to limit additions to the same order of magnitude, as guaranteed by clock time position, reduces the number of bits required to represent a more precise number on all scales. This downsizing of the encoding requirement makes using a LUT feasible for numbers with better precision than anything that currently exits.

Bifurcation of negative and positive values assures that the result of any addition operation is monotonically increasing in magnitude. The process of bifurcation to opposite side of the register allows for the most efficient use of number cache memory. The bifurcations prevents wasted memory overhead caused by prescribing register address blocks for each negative and positive numbers. The position within the multiplication LUT can be used to imply the number bin, positive or negative, resulting from the multiplication operation. Alternatively there is a logical element within the device which routes the numbers to be positioned on opposite ends of the number register following the multiplication operation.

Summing two numbers beginning from one end of the number cache and replacing the value of the operation into the first available register, and working inwardly as illustrated in FIG. 8 allows addition operations of the same magnitude to occur within the same time window as established by the clock cycle rule. Stopping the inward summation based on the presence of a first empty register assures that positive and negative terms will not be summed with each other via LUT. Addition of a long series of numbers will happen among positive and negative bins from these opposite end of the register. The numbers will be added in adjacent pairs, and each follow clock cycle rules as established by total counts.

The exponent of the complete summation for each positive and negative numbers is based on a clock cycle rule established at runtime. The clock cycle count rule allows for more precision in numbers because all bits can be used to compose the mantissa bisection tree or other encoding independent of additional implicit exponent. By limiting the addition LUT register assignments to only operate on terms within the same base 2 exponent grouping, the number of registers required no longer grows exponentially relative to the total range of return numbers, which now is only bounded by input length because the exponent is implied.

Once single terms exist for both positive and negative numbers, the two numbers will be added by standard binary arithmetic. Doing this final addition by standard binary arithmetic is necessary to allow for a broad range of final number magnitudes to operate with each other.

How to Make the Invention:

The invention can be made using any type of Hardware Description Language. This includes but is not limited to VHDL, Verilog, CatapultC, Matlab HDL coder, C, and SystemC. Developed hardware was designed using hardware description language VHDL. Given the fact that VHDL is used a GHDL1 simulation environment is utilized together with GtkWave2 waveform representation tool to prove the results. The compilation process can be automatized using makefifiles under Linux OS. Compression matrix, multiplication mapping matrix and as well the sample matrices can be generated using a C based program or equivalent computer programming language. The developed Hardware Description Language is used to physically configure the circuitry of a FPGA, or other PLD and execute the methods described in the herein invention as described.

How to Use the Invention:

The invention can be used as a calculating device in both important required stages of development of machine learning models, namely a) training, the process of developing coefficients relating the input data to the output target and b) inference, the process of projecting the results of a trained model with respect to the new input data in order to obtain predictive results. The invention can be used with a standard computer system as an calculating device by connecting it via a data bus. A plurality of the device can be used in a single computer system.

Use in a Computer System and Practical Considerations:

Steps related to preprocessing of input data such as outlier removal can be applied before sending this input data to the programmable hardware device to reduce encoding error in the data set. The terms subject to scaling and preprocessing can be raw data inputs, weightings, activations, or end results. As a result of the preprocessing steps in the use case within a computer system the significance of precision for small absolute value terms can be greatly reduced with respect to modeling accuracy.

Generally, admissibility of lower precision number rounding for deep learning and other machine learning applications has been demonstrated only recently and make the current invention a relevant and timely contribution to the field of high performance computing devices. Different problems have different levels of acceptable rounding precision. However it is well established that there are vast numbers of applications for which the rounding errors introduced by the herein invention relative to higher precision standard IEEE 754 number encodings will have no detrimental effect.

Performance Improvements:

The invention described herein provides a device and method which is based on a reduced set of numbers used to represent IEEE 754 standard numbers. The input numbers used in the invention herein are are bound between −1, and 1, and represented by lower precision, 7, 8, 9, and 10 bit encodings. Multiplication and addition operations between those numbers are defined in LUTs. By using LUTs in place of standard binary arithmetic, significant performance improvements are achieved.

According to Xilinx™ FPGA spec document Floating-Point Operator v7.1 31 PG060, 6 clock cycles are required for multiplication between two numbers, and 8 clock cycles are required for addition. The referenced clock cycle requirements are for equivalently sized floating point numbers manipulated via binary arithmetic. Utilizing a LUT for the multiplication operation reduces the number of clock cycles required from 6 to 1, likewise the addition operation using a LUT can also be reduced from 8 to 1.

In the primary embodiment of the invention where both multiplication and addition operations are done via LUT the number of clock cycles required to execute each multiply and addition step can be reduced from 14 to 2 clock cycles.

It is noted that the reduction from 14 to 2 clock cycles is the theoretical limit which in real life implementation will be result in less improvement due to following limitations: timing constraints of the selected PLD will limit how many operations can be unwrapped per on clock cycle, loop unfolding as some loops might require splitting to multiply cycles due to timing constraints. However, given the fact that optimized and non-optimized solutions are thread equal, all these downsides will reflect to non-optimized solution thus the theoretical gain should not be far from real life scenario. This means the speed up and power consumption improvements associated with the invention should approach 7 times existing alternatives.

Embodiments:

Multiple embodiments of the invention are described which are novel and consider use the of the invention.

The primary embodiment of invention has been described thus far in the preceding sections of the disclosure. The primary embodiment covers all encoding sizes mentioned, and the encoding types shown in FIG. 6. Embodiment variations with these different encoding types as shown can be applied in the invention as described. These encodings are used with an additional implied exponent. In the exemplary encoding shown in FIG. 5, the encoding method is Unsigned Full Mantissa. An encoding using an explicit exponent term can be used, with the same methods described thus far. An explicit exponent will increase the precision on smaller magnitude intervals. These embodiment do not prevent the use of a single addition LUT with implied exponent, but they do alter the encoding error distributions of given input number pairs. Generally a full mantissa encoding will result in lowest encoding error among uniformly distributed inputs. The encoding embodiment used can be problem dependent.

Implementation of the invention on encodings of bit numbers aside from those mentioned primarily, 7-10 bit numbers, should be considered no different than the disclosed invention herein. The specific bit numbers are referenced because they are most feasible and practical to implement on commercially available hardware.

An embodiment of the invention picture in FIG. 1 is a computer system containing multiple variations of the devices described, each of which are programmed with different encoding types and sizes, which can be optimized for their expected problem input. The standard computing system takes user inputs in IEEE 754 standard architecture, and compiles instructions to the PLDs to execute specific multiply accumulate operations. The PLD chosen for each of the calculations can be based on precision requirements, or each of the PLDs can work in parallel to deliver a lower total execution time of instructions for the system as a whole. Instruction sets can be routed to each of the custom configured PLDs based on data and problem characteristics. The computer system can be a locally contained machine or a remote host with interface to the PLD chip sets connected via any known method.

An embodiment of the invention can check the sign of the input values before referencing the LUT record. Each sign check will add an extra clock cycle to the resulting operation, but will reduce the size of the LUT stored in memory by half. The primary, minimum time, embodiment of the invention will require the full set of LUT records between positive and negative inputs to be stored, whereas the embodiment including sign checks reduces the memory overhead of the LUTs and can be beneficial if the total amount of SRAM available on the PLD is not sufficient to include the full LUT for either multiplication or addition operations or both.

An alternate embodiment of the invention is where multiplication via LUT is done, and its returns a number type of standard IEEE 754 format. Namely 16 bit "half", or 32 bit "single". In this embodiment the addition function is carried out via standard binary arithmetic. The embodiment could be preferable to use in instances where the addition LUT operation as described introduces an unacceptable amount of error.

The presently disclosed technology also includes a non-transitory machine-readable medium comprising: a lookup table stored in memory for the multiplication of two numbers; and a lookup table stored in memory for the addition of two numbers; wherein the multiplication LUT register assignments correspond to the two input numbers of the operation; wherein the multiplication LUT returns the number resulting from the operation with minimum absolute error as represented in low precision binary code; wherein the multiplication LUT returns a number of magnitude in the range between 0 and 1, inclusive; wherein the multiplication LUT returns a number associated with register addresses for addition LUTs; wherein the addition LUT register assignments correspond to the two input numbers of the operation; wherein the addition LUT is limited to operating on numbers of the same sign; wherein the addition LUT is limited to operating on numbers of the same base 2 exponent; wherein the addition LUT returns a number encoded in the between 0 and the next largest base 2 exponent inclusive relative to the input exponent; wherein the addition LUT returns numbers rounded higher or lower in equal proportion for each encoding magnitude where an exact return encoding is not available; wherein the addition LUT returns a number in the same encoding format as the original inputs used to determine register address.

The invention claimed is:

1. A computer processor for executing Multiply Accumulate operations comprising:

a multiplication lookup table ("LUT") stored in memory for a multiplication of two numbers; and an addition LUT stored in memory for an addition of the two numbers;

wherein the multiplication LUT registers assignments correspond to the two numbers of a multiplication operation;

wherein the multiplication LUT returns a number resulting from the multiplication operation with minimum absolute error as represented in low precision binary code;

wherein the multiplication LUT returns a number with a magnitude in a range from 0 to 1;

wherein the multiplication LUT returns a number associated with register addresses for addition LUTs;

wherein the addition LUT registers assignments correspond to the two numbers of the operation;

wherein the addition LUT is limited to operating on numbers of a same sign;

wherein the addition LUT is limited to operating on numbers of a same base 2 exponent;

wherein the addition LUT returns a number encoded in a range between 0 and an input exponent minus one;

wherein the addition LUT returns numbers rounded higher or lower in equal proportion for each encoding magnitude where an exact return encoding is not available;

wherein the addition LUT returns a number in the same encoding format as the two numbers used to determine register address;

wherein a count of clock cycles is used to calculate a base-2 exponent of a sum of a plurality of terms, each of the plurality of terms being in a range of zero (0) to one (1);

wherein, the base-2 exponent of the sum corresponds to an upper bound of a range of the sum expressed in powers of two (2);

wherein, the sum is calculated using the addition LUT;

wherein the count of clock cycles corresponds to a time spent in calculating the sum of the plurality of terms;

wherein the count of clock cycles is calculated from a count of the plurality of terms being added, a second count of clock cycles spent for each addition between the plurality of terms, and a static buffer;

wherein, the static buffer corresponds to a third count of additional clock cycles spent when a base-2 exponent of the sum increases.

2. The processor of claim 1, wherein the two numbers are in the range from −1 to 1.

3. The processor of claim 1, wherein input numbers are rounded to 7 bit, 8 bit, 9 bit, or 10 bit encodings.

4. The processor of claim 1, wherein the results of the multiplication operation are bifurcated according to sign to opposite ends of a number cache.

5. The processor of claim 1, wherein an addition operation between a final positive and negative sums is done via binary arithmetic.

6. A computer system comprising a plurality of computer processors of claim 1.

7. The computer system of claim 6, wherein input data are distributed among the processors and multiply accumulate functions are executed in parallel.

8. The computer system of claim 6, wherein the plurality of computer processors are caused to distribute a computational load among the processors and execute multiply accumulate functions in parallel.

9. The computer system of claim 6, wherein various encoding schemes for each individual processor are used.

10. The computer system of claim 6, wherein different numbers of bits for different levels of precision of encodings for each individual processor are used.

11. A method comprising:

a multiplication lookup table ("LUT") stored in memory for a multiplication of two numbers; and an addition LUT stored in memory for an addition of the two numbers;

wherein the multiplication LUT register assignments correspond to the two input numbers of a multiplication operation;

wherein the multiplication LUT returns a number resulting from the multiplication operation with minimum absolute error as represented in low precision binary code;

wherein the multiplication LUT returns a number of with a magnitude in a range from 0 to 1;

wherein the multiplication LUT returns a number associated with register addresses for addition LUTs;

wherein the addition LUT register assignments correspond to the two input numbers of the operation;

wherein the addition LUT is limited to operating on numbers of a same sign;

wherein the addition LUT is limited to operating on numbers of a same base 2 exponent;

wherein the addition LUT returns a number encoded in a range between 0 and an input exponent minus one;

wherein the addition LUT returns numbers rounded higher or lower in equal proportion for each encoding magnitude where an exact return encoding is not available;

wherein the addition LUT returns a number in the same encoding format as the two numbers used to determine register address;

wherein a count of clock cycles is used to calculate a base-2 exponent of a sum of a plurality of terms, each of the plurality of terms being in a range of zero (0) to one (1);

wherein, the base-2 exponent of the sum corresponds to an upper bound of a range of the sum expressed in powers of two (2);

wherein, the sum is calculated using the addition LUT;

wherein the count of clock cycles corresponds to a time spent in calculating the sum of the plurality of terms;

wherein the count of clock cycles is calculated from a count of the plurality of terms being added, a second count of clock cycles spent for each addition between the plurality of terms, and a static buffer;

wherein, the static buffer corresponds to a third count of additional clock cycles spent when a base-2 exponent of the sum increases.

12. The method of claim 11, wherein the two numbers are in the range from −1 to 1.

13. The method of claim 11, wherein input numbers are rounded to 7 bit, 8 bit, 9 bit, or 10 bit encodings.

14. The method of claim 11, wherein the results of the multiplication operation are bifurcated according to sign to opposite ends of a number cache.

15. The method of claim 11, wherein an addition operation between a final positive and negative sums is done via binary arithmetic.

16. A non-transitory machine-readable medium comprising:

a multiplication lookup table ("LUT") stored in memory for a multiplication of two numbers; and an addition LUT stored in memory for an addition of the two numbers;

wherein the multiplication LUT register assignments correspond to the two numbers of a multiplication operation;

wherein the multiplication LUT returns a number resulting from the multiplication operation with minimum absolute error as represented in low precision binary code;

wherein the multiplication LUT returns a number of magnitude in a range from 0 to 1;

wherein the multiplication LUT returns a number associated with register addresses for addition LUTs;

wherein the addition LUT register assignments correspond to the two input numbers of the operation;

wherein the addition LUT is limited to operating on numbers of a same sign;

wherein the addition LUT is limited to operating on numbers of a same base 2 exponent;

wherein the addition LUT returns a number encoded in a range between 0 and an input exponent minus one;

wherein the addition LUT returns numbers rounded higher or lower in equal proportion for each encoding magnitude where an exact return encoding is not available;

wherein the addition LUT returns a number in the same encoding format as the two numbers used to determine register address;

wherein a count of clock cycles is used to calculate a base-2 exponent of a sum of a plurality of terms, each of the plurality of terms being in a range of zero (0) to one (1);

wherein, the base-2 exponent of the sum corresponds to an upper bound of a range of the sum expressed in powers of two (2);

wherein, the sum is calculated using the addition LUT;

wherein the count of clock cycles corresponds to a time spent in calculating the sum of the plurality of terms;

wherein the count of clock cycles is calculated from a count of the plurality of terms being added, a second count of clock cycles spent for each addition between the plurality of terms, and a static buffer;

wherein, the static buffer corresponds to a third count of additional clock cycles spent when a base-2 exponent of the sum increases.

17. The non-transitory machine-readable medium of claim 16, wherein the two numbers are in the range from −1 to 1.

18. The non-transitory machine-readable medium of claim 16, wherein input numbers are rounded to 7 bit, 8 bit, 9 bit, or 10 bit.

19. The non-transitory machine-readable medium of claim 16, wherein the results of the multiplication operation are bifurcated according to sign to opposite ends of a number cache.

20. The non-transitory machine-readable medium of claim 16, wherein the addition operation between a final positive and negative sums is done via binary arithmetic.

* * * * *